(12) United States Patent
Kawate et al.

(10) Patent No.: US 6,642,711 B2
(45) Date of Patent: Nov. 4, 2003

(54) DIGITAL INDUCTIVE POSITION SENSOR

(75) Inventors: Keith W. Kawate, Attleboro Falls, MA (US); Gerhard A. Foelsche, Rehoboth, MA (US); Lidu Huang, Palatine, IL (US); Gerald H. Fleischfresser, Wheaton, IL (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/043,406

(22) Filed: Jan. 10, 2002

(65) Prior Publication Data

US 2002/0097042 A1 Jul. 25, 2002

Related U.S. Application Data

(60) Provisional application No. 60/263,798, filed on Jan. 24, 2001.

(51) Int. Cl.$^7$ .............................. G01B 7/00; G01B 7/14; G01B 7/30; G01D 5/20; H03M 1/22
(52) U.S. Cl. .............................. 324/207.17; 324/207.24; 324/207.25; 336/45; 336/75; 341/15
(58) Field of Search ................ 324/207.16–207.19, 324/207.24, 207.25; 336/45, 75, 77, 79, 130, 131, 192, 199, 200; 33/706, 708; 340/870.32–870.36; 318/660, 661; 341/15

(56) References Cited

U.S. PATENT DOCUMENTS

| | | | |
|---|---|---|---|
| 4,507,639 A | | 3/1985 | Trenkler et al. |
| 4,737,698 A | | 4/1988 | McMullin et al. |
| 4,891,590 A | * | 1/1990 | Hammel et al. ......... 324/207.17 |
| 5,793,206 A | * | 8/1998 | Goldfine et al. ..... 324/207.17 X |
| 5,815,091 A | | 9/1998 | Dames et al. |
| 5,841,274 A | | 11/1998 | Masreliez et al. |
| 5,973,494 A | * | 10/1999 | Masreliez et al. ...... 324/207.24 |
| 6,011,389 A | | 1/2000 | Masreliez et al. |
| 6,014,091 A | * | 1/2000 | Noltemeyer et al. ....... 341/15 X |
| 6,049,204 A | * | 4/2000 | Andermo et al. ....... 324/207.17 |
| 6,091,310 A | * | 7/2000 | Utsumi et al. .......... 336/200 X |
| 6,166,535 A | | 12/2000 | Irle et al. |
| 6,236,199 B1 | | 5/2001 | Irle et al. |
| 6,255,810 B1 | | 7/2001 | Irle et al. |
| 6,366,078 B1 | | 4/2002 | Irle et al. |
| 6,384,597 B1 | | 5/2002 | Irle et al. |
| 6,384,598 B1 | | 5/2002 | Hobein et al. |

* cited by examiner

*Primary Examiner*—Gerard R. Strecker
(74) *Attorney, Agent, or Firm*—Russell E. Baumann; Frederick J. Telecky, Jr.

(57) ABSTRACT

A differential pulse transformer having a drive coil (10a) and differential sense coils (10b) are disposed on a planar surface with a target (10e, 10f) movable over the sense coils to cause an imbalance in magnetic field when a large di/dt pulse is generated in the drive coil. A detection circuit senses the imbalance and provides a digital output accurately identifying the position of the target. Coil and target embodiments include relatively small secondary coils and relatively long targets (10b, 10e/10f; 12b, 12e/12f and 14b) and relatively large secondary coils and short targets (16b, 16c; 18b, 18c; 20b and 22b).

10 Claims, 8 Drawing Sheets

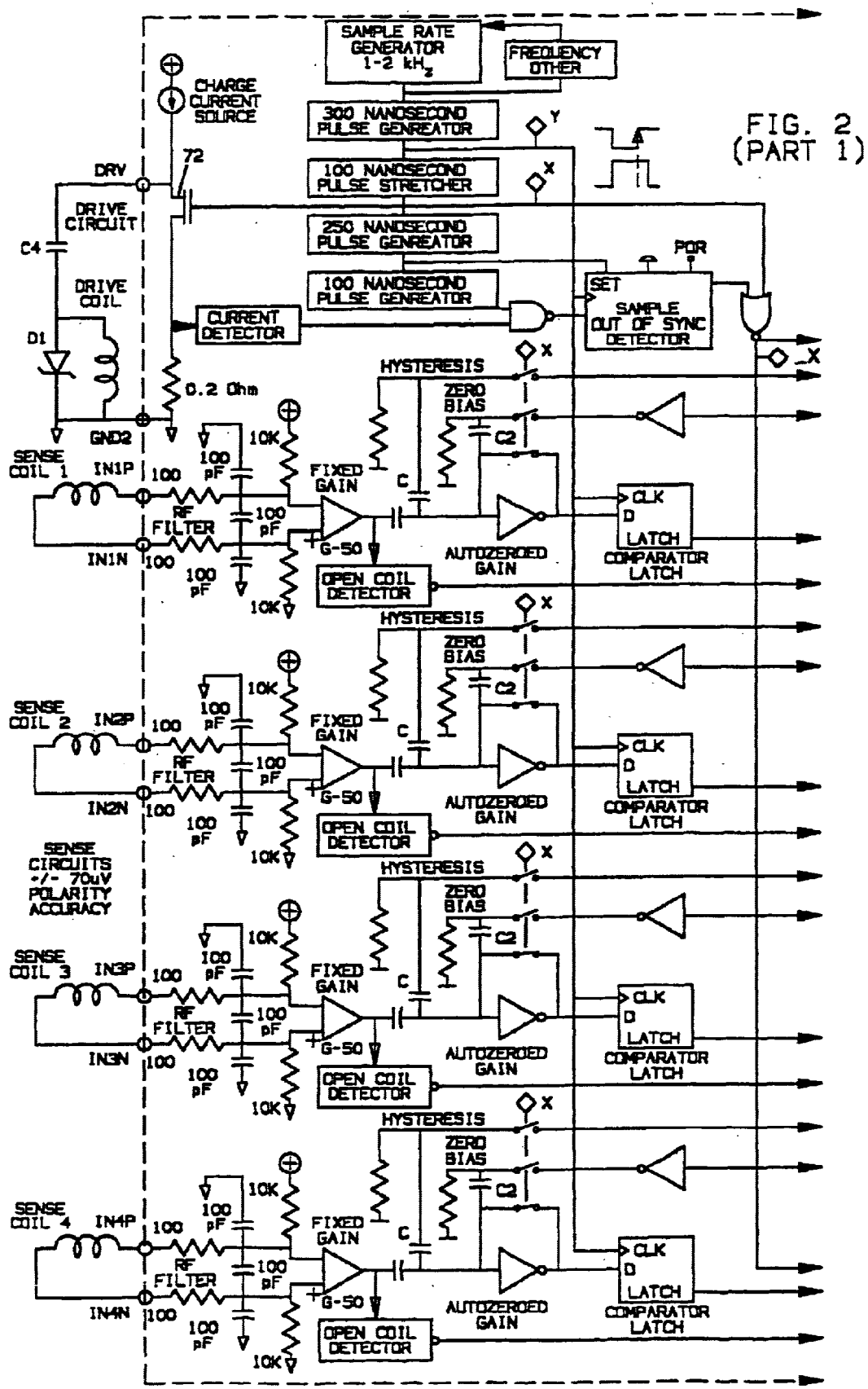
FIG. 2 (PART 1)

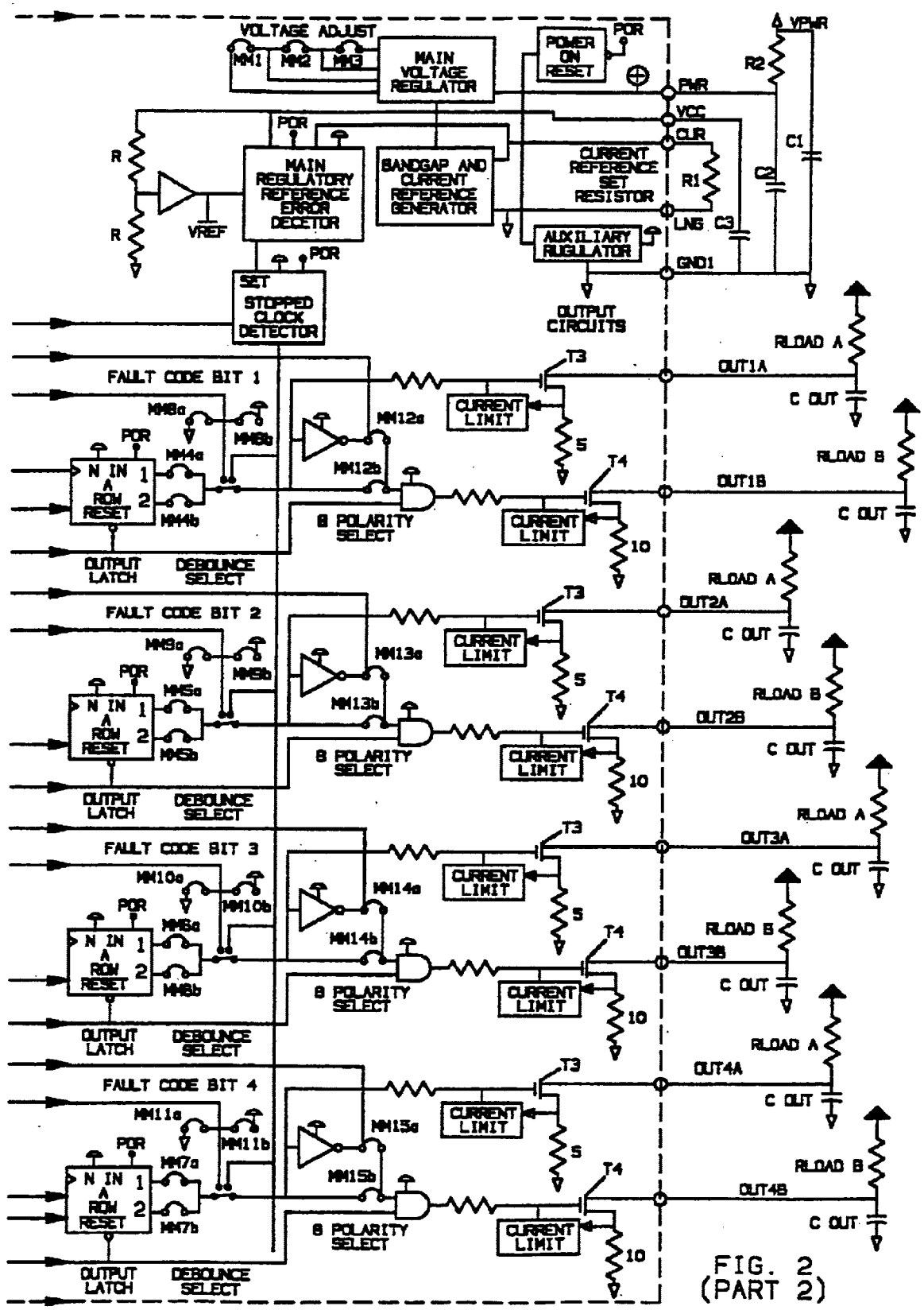
FIG. 2 (PART 2)

DIGITAL INDUCTIVE POSITION SENSOR

RELATED APPLICATIONS

This application claims priority under 35 USC §119(e) (1) of provisional application No. 60/263,798 filed Jan. 24, 2001.

FIELD OF THE INVENTION

The invention relates generally to non-contact position sensors and more particularly to such sensors which are digital pulse transformer position sensors.

BACKGROUND OF THE INVENTION

There are many instances in which it is desired to determine the position of a component. Generally, systems for providing this information rely on the interconnection of electromechanical circuits through electrical contacts, i.e., a contact position sensor, or the change in the strength of an electrical characteristic, such as magnetic flux in a transformer system, such as magnetic flux in an LVDT (linear variable displacement transducer) or a Hall effect transducer. The former systems are typically inexpensive but are subject to mechanical wear over time. The latter systems can be expensive, as in the case of the windings of LVDT's, and are somewhat temperature sensitive requiring some type of temperature compensation or, in the case of systems relying on the use of permanent magnets, are sensitive to the accumulation of ferromagnetic debris which can affect the accuracy thereof, as well as having limitations in the location of the magnet.

SUMMARY OF THE INVENTION

An object of the present invention is the provisions of a robust, highly accurate and reliable non-contact position sensor. Another object of the invention is the provision of a position sensor which is free of the above noted limitations of the prior art.

Briefly stated, a position sensor made in accordance with the invention comprises at least one primary or drive coil disposed on a planar surface and at least one differential secondary or sense coil disposed in magnetic field receiving relationship with the drive coil on a planar surface, that is, a sense coil having a pair of loops arranged generally in a figure eight pattern with the cross-over from one loop to the other effected by suitable means to provide oppositely directed induced voltages within the two loops, such as by jumpers, or by vias arranged in a circuit board with interrupted loops on one layer of a board and terminations of the interrupted loops connected to vias having a conductive layer going to another board layer where traces are formed to provide cross over connections. The loops of the sense coil are configured so that the flux generated in one loop substantially equals the flux generated in the other loop and the oppositely directed induced voltages in the two loops cancel, resulting in zero output voltage. In accordance with the invention, a generally planar target of electrically conductive material is movably mounted to pass over the sense coil. At a sufficiently high frequency, the magnetic field will generate eddy currents in the target which distort the magnetic field. The target is moved over one or the other of the loops so that an output of a given polarity is produced. When the target moves through a transition point, the output switches to the opposite polarity.

According to a feature of the invention, power requirements are reduced by providing a pulse excitation in the primary coil, a di/dt of one or two amps/microsecond, on a continuing basis having a selected period, e.g. every millisecond. A measurement taking approximately 1 microsecond is obtained by a detection circuit and is latched for the remainder of the period. The measurement process is then repeated on a continuing basis.

In accordance with the invention, the detection circuit determines whether the signal is greater or less than zero and thus provides a precise indication of the location of the target at the transition point where the output signal flips from one polarity to the opposite polarity.

According to a feature of the invention, individual bits are provided with the relationship between patterns in each bit row and the target being varied to provide transition points at different locations along an axial length enabling binary counting. According to one preferred embodiment, a four bit sensor is provided resulting in 16 measurable positions.

In one preferred embodiment, a separate target portion is moved across each loop. In another preferred embodiment, a narrow target is arranged to pass serially over each loop of the sense coils.

According to a feature of the invention, the loops of the secondary coils are formed symmetrically adjacent to the transition point and can be widened adjacent to the transition point to exaggerate the signal difference and increase sensitivity. According to yet another feature, extra pieces may be provided for one or both loops of a secondary to permit trimming in order to ensure that the total flux produced in one loop will be the same as the other loop of a sense coil. According to a feature of the invention, the pattern of the sense coils can be varied to change the physical location of the transition relative to the overall length of the sense coils, e.g., one loop of the sense coil, while enclosing the same area as the other sense coil loop, can have a long, narrow configuration relative to the other loop. Both loops would preferably still have a symmetrical widening at the transition zone. According to yet another feature, the electronics are preferably provided with hysteresis at least equal to any expected electrical noise to stabilize the output at the transition zone. According to still another feature, a nulling target could be provided over one loop and an enhancing target over the other loop.

According to a preferred embodiment of the invention, a four layer circuit board is used with one outer layer having both primary or drive and secondary or sense coils disposed thereon utilizing photolithographic techniques providing a high degree of accuracy for the coil patterns. A second layer includes the interconnecting traces for the transition zones which cooperate with vias having an electrically conductive lining going through the layers. The vias may be filled with ferromagnetic material to enhance the inductive field. The remainder of the second layer is provided with a ground layer or copper or the like. A third outer layer has the associated electronics disposed thereon including an ASIC with the drive circuit and the detection circuit while the fourth layer is provided with interconnections for the electronics and the remainder having a copper ground layer.

Additional objects and advantages of the invention will be set forth in part in the description which follows and in part will be obvious from the description. The objects and advantages of the invention may be realized and attained by the means of the instrumentalities, combinations and methods particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and the principles of the invention. In the drawings:

FIG. 2 is a schematic of an ASIC having a drive circuit for one drive coil and a detection circuit for four sense coils according to another preferred embodiment of the invention;

DETAILED DESCRIPTION OF PREFERRED EMBODIMENTS

Figure 1:
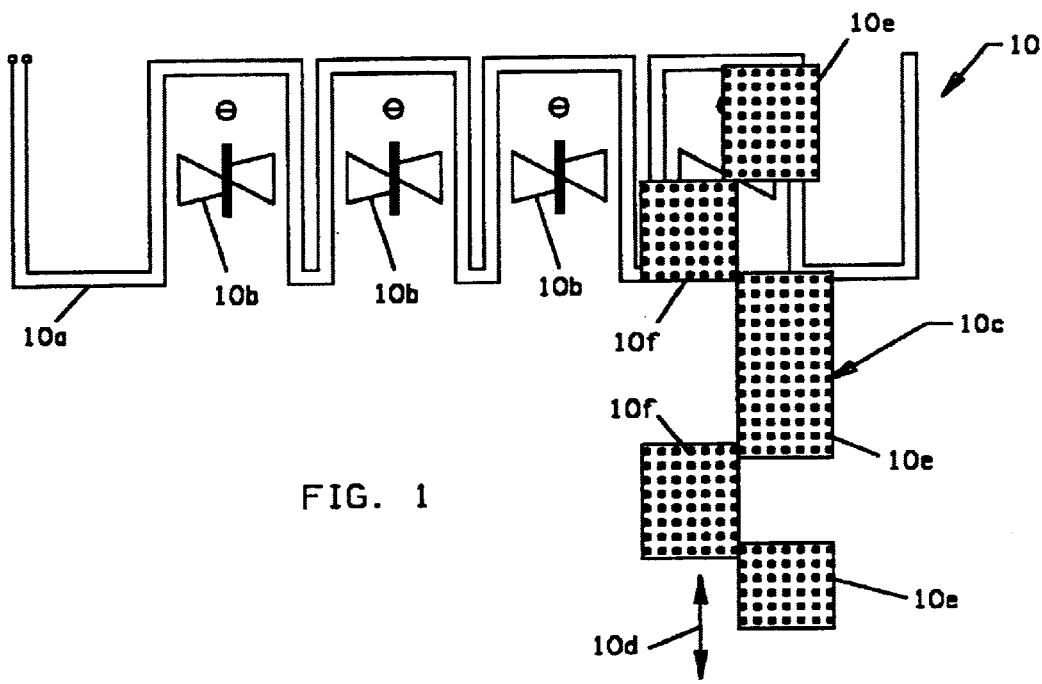
FIG. 1 is a schematic diagram of a drive coil and four differential sense coils, each sense coil having an associated movable target, but for clarity of illustration, showing one such target, made in accordance with a preferred embodiment of the invention.

With reference to FIGS. 1, 1a–1c, a non-contact position sensor system 10 made in accordance with a first embodiment of the invention is shown comprising a primary coil 10a and a plurality of secondary sense coils 10b, each mounted on a planar surface of a suitable substrate such as a printed circuit board. The sense coils are disposed in a row next to one another along a selected direction. An electrically conductive target 10c is movable over each coil along a measurement axis perpendicular to the selected direction. Each target 10c has a plurality of target portions of selected varied lengths and spacing relative to the direction of movement 10d (only one target being shown for clarity of illustration). Differential sense coil 10b comprises first and second loops arranged so that current induced in the loops will travel in opposite directions, see FIG. 1a, and has a geometry such that the induced magnetic field will be cancelled providing a net output of zero voltage when the loops are not affected by a nulling target, to be discussed, advantageously utilizing the accuracy of photolithographic techniques for forming the coils as well as target portions on separate substrates. Each target 10c includes spaced apart portions 10e movable over one loop and portions 10f movable over the other loop of the respective sense coil. Portions 10e and 10f have lengths and spacing chosen to correspond to the desired location of transition (cross-over) points where the output changes from one polarity to the opposite polarity.

Figure 1A:
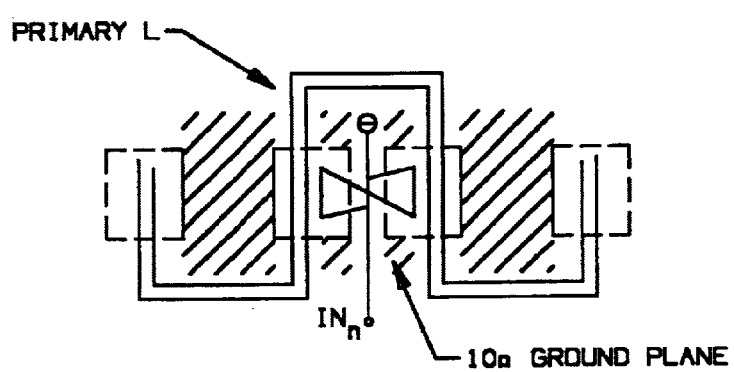
FIG. 1a shows a portion of the primary or drive coil and one sense coil of FIG. 1
Figure 1B:
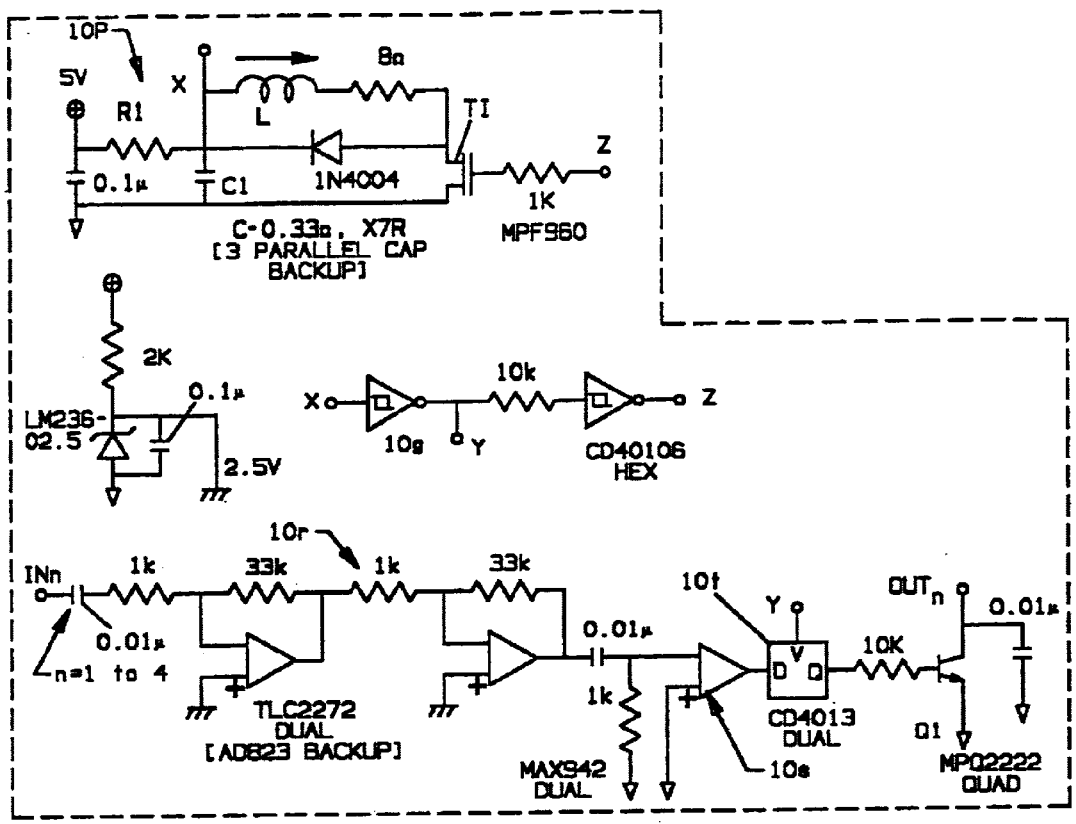
FIG. 1b shows a drive and detection circuit for the FIGS. 1, 1a drive and sense coils.
Figure 1C:
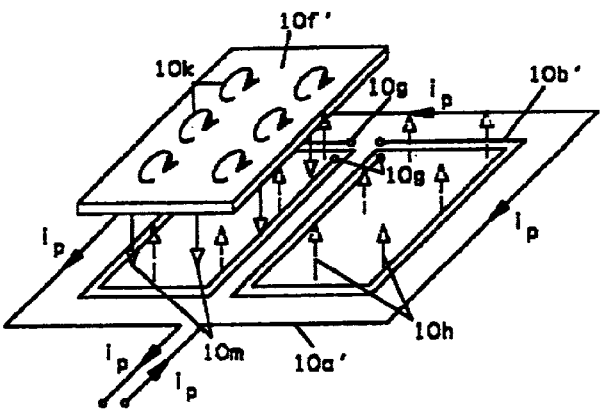
FIG. 1c is a perspective view showing a modified drive coil and differential sense coil with a target portion disposed over one of the differential sense coil loops.

By way of explanation, as shown in FIG. 1c, a modified drive coil 10a' and a differential sense coil 10b' having two turns is illustrated with a target portion 10f' disposed over one of the loops of sense coil 10b'. In the illustrated sense coil, the cross over points between the two differential loops are effected by suitable means such as by circuit paths formed on another layer of a circuit board, not shown, and connected through vias 10g. A varying current in primary coil 10a' generates a magnetic field as indicated by dashed arrows 10h which generates eddy currents 10k in targets 10f'. The eddy currents generate a magnetic field as indicated by arrows 10m which opposes the field over the targeted loop and nulling at least a portion of the field in that loop with the resulting imbalance in the sense coil having a polarity based on the loop which is not targeted at that time. As shown in FIG. 1a, a ground plane 10n may be placed around the sense coils to mitigate stray magnetic radiation.

With respect to FIG. 1b, a drive circuit 10p is shown for providing a large di/dt comprising a capacitor C1 equal to approximately 0.33 uf charged by a resistor R1 of 1K ohms with a 5 volt source. This results in the capacitor charging up to 5 volts in approximately 1 millisecond and utilizing a Schmidt trigger 10q, when x reaches a selected high y goes low and z goes high turning on transistor TI to immediately discharge capacitor C1. When capacitor C1 is discharged x will be low along with z turning off the transistor and allowing the capacitor to charge up again.

Also shown in FIG. 1b is a detection circuit having an input INn fed to amplifier stage 10r, a comparator 10s, a latch 10t and an output transistor Q1. Current in the sense coil, see output INn in FIG. 1a, is fed into the detection circuit and is latched by latch 10t under the control of Schmidt trigger 10q when a pulse is sensed by comparator 10s.

The above arrangement pulses the drive coil with a large di/dt on the order of 1 amp per microsecond on a continuing basis approximately every millisecond. The detection circuit responds to a positive or a negative pulse occurring in the sense coils. Target portions are formed on a suitable substrate as by photolithography on a circuit board so that in the case of the FIG. 1 embodiment, four bits are provided for a binary code to precisely identify the location of the targets.

FIG. 2 shows an ASIC (application specific integrated circuit) for a non-contact position sensor made in accordance with another embodiment of the invention in which positional displacement is indicated by a four bit code which appears as high or low voltage at four outputs. In addition, the ASIC detects internal faults and indicates these faults through mask-programmable output codes. The polarity of voltage produced in four coils is detected to produce unique codes for up to sixteen positions.

The drive circuit comprises a capacitor C4 for connection with the drive coil charged by a charge current source and connected to discharge through transistor T2. The drive circuit pulls one end of the charged external capacitor C4 to ground through an internal current monitoring resistor. The other end of the capacitor is connected to an external grounded drive coil. Due to the inductance of the coil, grounding the capacitor produces an approximately linear current ramp resulting in a sustained signal to the sense input. A sample rate generator provides a signal x for turning on the transistor allowing the capacitor to discharge producing the desired di/dt pulse as well as a signal y for latching a sampled value in each sense circuit to be discussed.

Sense coils 1–4 have connections IN1P, IN1N–IN4P, IN4N which feed into four identical channels or sense circuits which detect the polarity of the signal between a respective INP pin and an INN pin a fixed time after the beginning of the drive circuit current pulse. The polarity is then stored in the output latch labeled COMPARATOR LATCH of the respective channel until the next polarity is sampled. The sense channel input amplifiers are differential and the impedances of INP and INN are matched in order to reject common mode radio frequency current injection. The sense channels, in addition to the differential amplifiers include an open coil detector, auto zeroed gain, comparator latch, an n in a row output latch, debounce select, B polarity select, a current limit, hysteresis and zero bias and is split into first and second outputs through a transistor T3, T4.

Figure 2A:
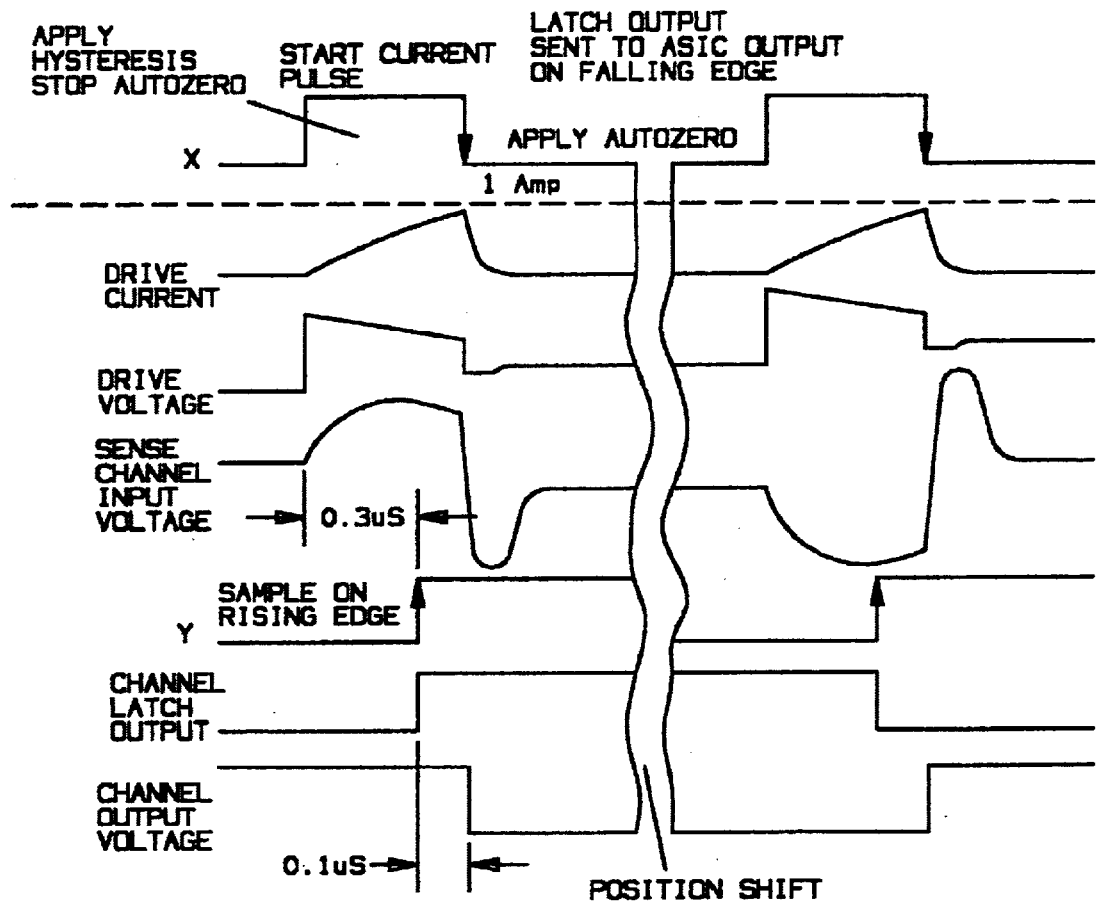
FIG. 2a is a diagram for the timing waveforms for the FIG. 2 ASIC.

FIG. 2a shows the timing waveforms for drive current and voltage; sense channel input voltage; channel latch output and voltage; x signal and y signal for the FIG. 2 ASIC.

Figure 3:
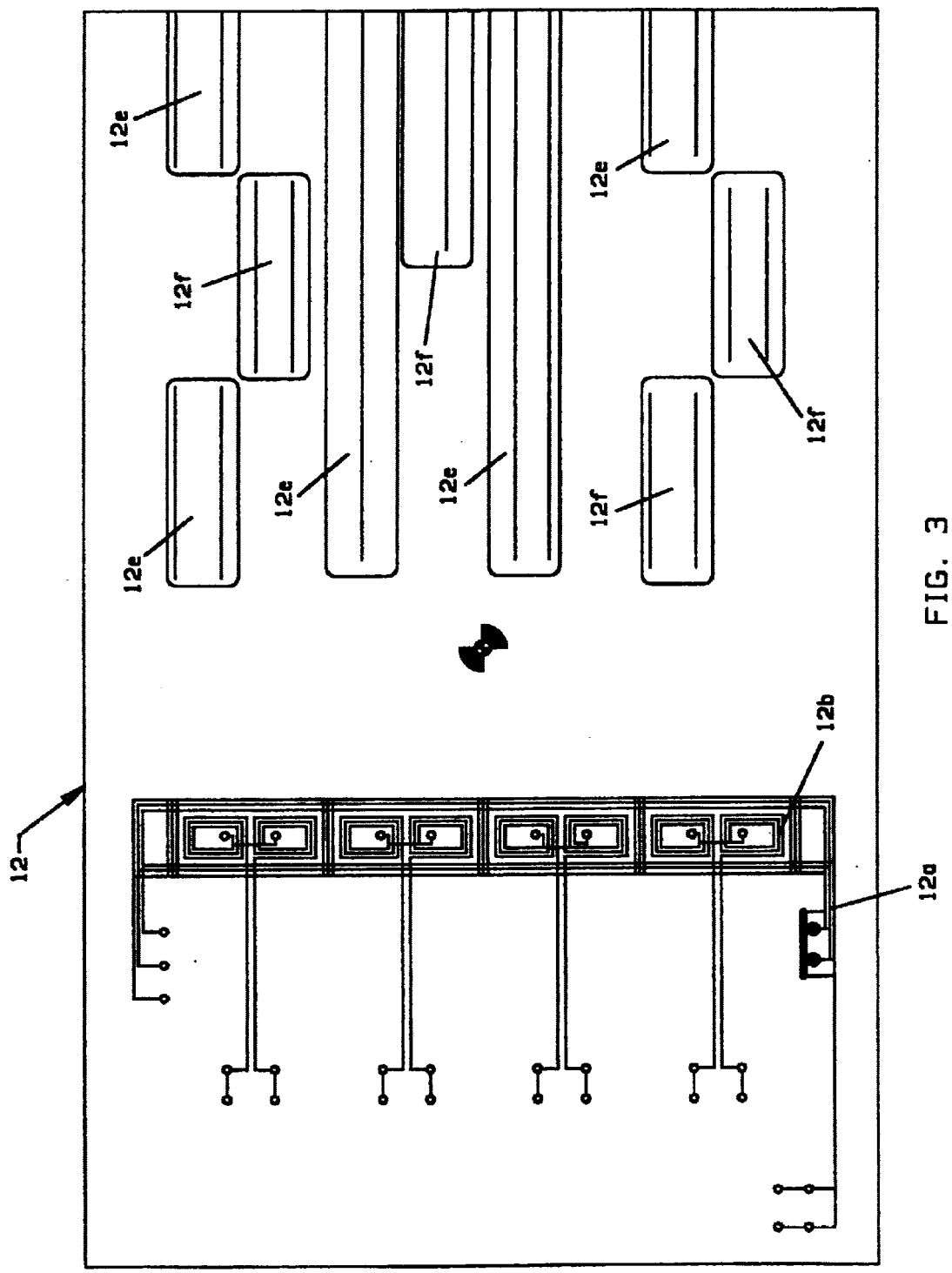
FIG. 3 is a top plan view of a modification of the FIG. 1 embodiment.

FIG. 3 shows a circuit board 12 having a drive coil section 12a, a four bit differential sense coil section 12b and targets 12e, 12f, broken off at the right extremity for purposes of illustration, the targets being movable in the horizontal direction as show in the drawing. It should be noted that the cross-over between the two loops of the differential sense coils is disposed on a layer of the circuit board spaced from the layer on which the remainder of the coils are disposed. The sense coils are each provided with several turns and the primary is arranged to provide one or more turns as desired.

Figure 4:
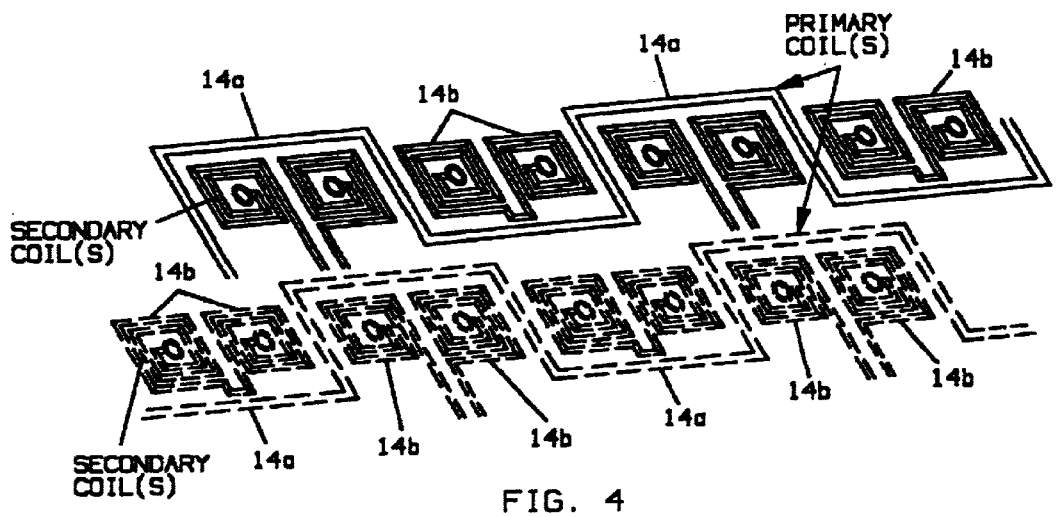
FIG. 4 is a perspective schematic view showing an embodiment in which a primary coil and a plurality of sense coils are both disposed on separate planar layers.

FIG. 4 shows the placement of both drive and sense coils 14a, 14b respectively on two spaced apart planar surfaces, as by placing them on separate layers of a circuit board (not shown).

Figure 5:
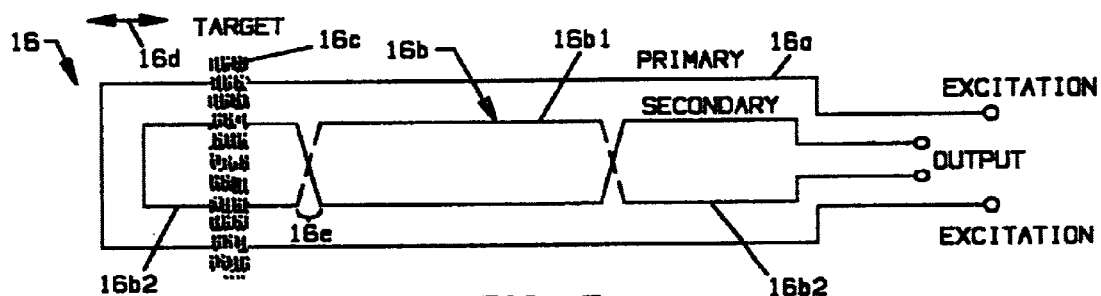
FIG. 5 is a schematic of another embodiment of the invention which comprises a relatively short length target (relative to the direction of movement of the target)
Figure 5A:
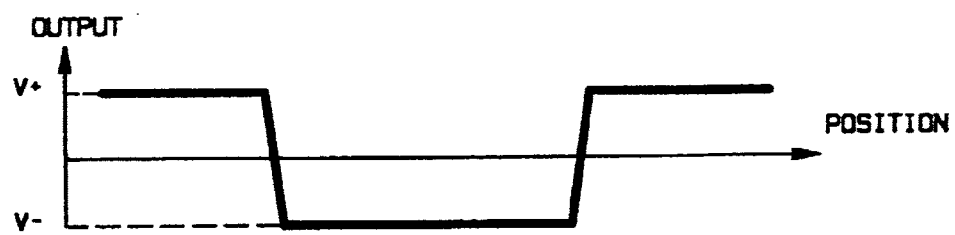
FIG. 5a is a plot showing output voltage relative to the position of the target of the FIG. 5a embodiment.

FIG. 5 shows a modified embodiment, sense system 16 in which sense coil 16b comprises one loop portion 16b1 and two portions 16b2 form another loop, all arranged along a measurement axis which extends in a direction parallel to line 16d and which are enclosed within drive coil 16a. A target 16c having a layer of electrically conductive material is formed with a short length taken in the direction of the measurement axis and is movable along the axis over the sense coils. The target preferably has a width at least as wide as the sense coils and preferably sufficiently wide to extend beyond drive coil 16a as shown. The length of target 16c is preferably selected to be at least as long as the transition between portions of two adjacent loops 16e. Movement of target 16c along the measurement axis causes an imbalance, i.e., a decrease in current in the portion of the loop aligned with the target which is detected as a pulse, the position of target 16c shown in FIG. 5 causing a decrease in the negative polarity current so that the net at that position results in a positive voltage. The FIG. 5 embodiment provides a more compact package due to the short length of the target.

Figure 6:
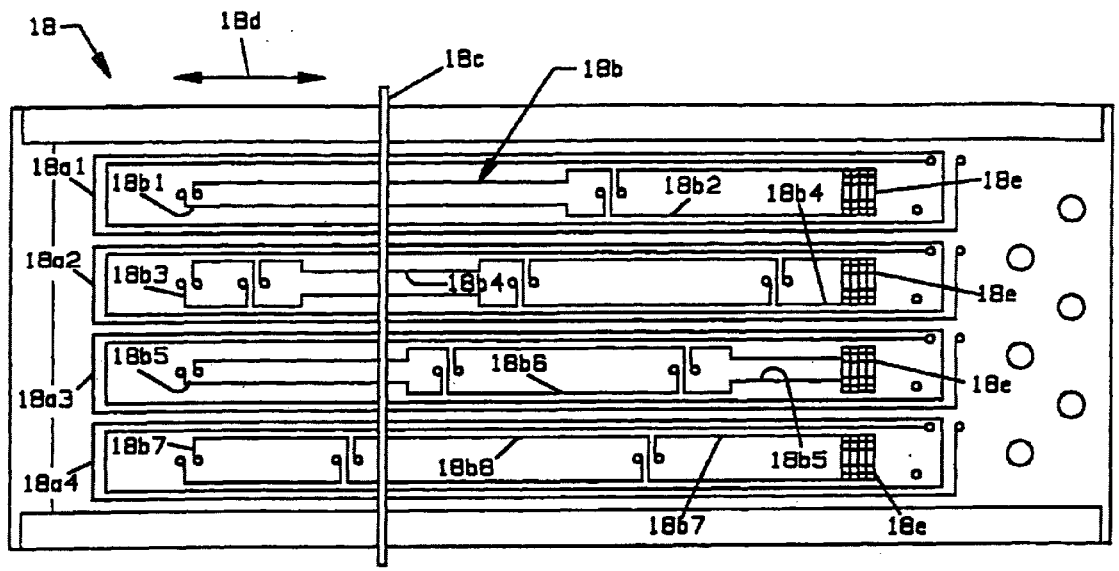
FIG. 6 is a modification of the FIG. 5 embodiment showing four drive coils and associated sense coils with a single movable target.

FIG. 6, a variation of the FIG. 5 embodiment, shows sensor system 18 in which four output bits are provided by four separate drive coils 18a1–18a4 each comprising two turns with drive coil 18a1 enclosing differential sense coil loops 18b1; 18b2; drive coil 18a2 enclosing differential sense coil loops 18b3 (two portions) 18b4 (two portions); drive coil 18a3 enclosing differential sense coil loops 18b5 (two portions), 18b6; and drive coil 18a4 enclosing differential sense coil loops 18b7 (two portions) 18b8. As in all the embodiments of the invention, the loops are designed so that the flux produced by current flowing in one direction of all the portions of one loop equals the flux produced by current flowing in the opposite direction of all the portions of the other loop; however, by making various portions of a loop narrow the loop is elongated thereby changing the position of the transition between the two loops. Further, as shown in FIG. 6, one loop can have more than one portion separated from one another by at least a portion of the other loop through a transition location defining a bit transition. Target 18c, movable along a measurement axis parallel to the line 18d causes an imbalance in the sense coil setting a 1 bit when aligned with loops 18b1, 18b3, 18b5 and 18b7 and a 0 bit when aligned with loops 18b2, 18b4, 18b6 and 18b8. The sense coils are shown with a portion 18e comprising small areas enclosed by a conductive trace which can be laser cut, if necessary, to adjust the magnetic field relative to the other loop of a respective sense coil to achieve a balance when manufacturing the sensor.

Figure 7:
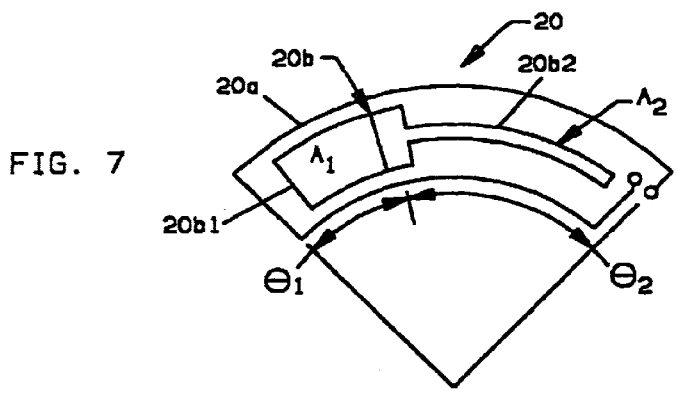
FIG. 7 shows a modified embodiment in which the coils are disposed along an arc along which the target (not shown) moves.
Figure 7A:
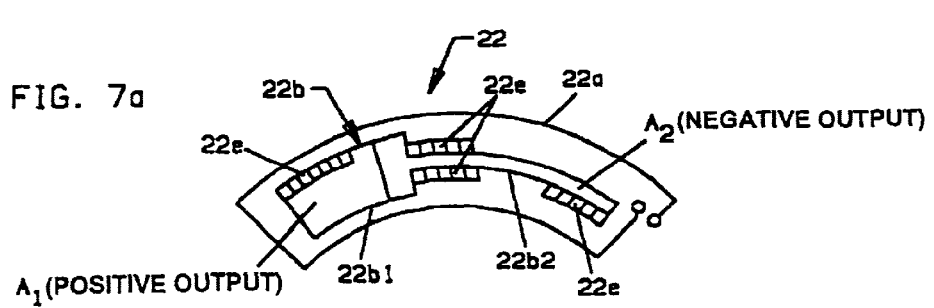
FIG. 7a is a modification of the FIG. 7 embodiment.

Although the various coil arrangements described above are arranged along a straight line, they can also be formed for movement of the target along an arc, as shown in FIG. 7 in which coil set 20 comprises drive coil 20a enclosing differential sense coils 20b (loops 20b1, 20b2) all arranged along an arc along which a target (not shown) also moves as in the above described embodiments. FIG. 7a shows a similar embodiment 22 having drive coil 22a enclosing differential sense coils 22b arranged along an arc with sense coil portions 22b1 and 22b2 having portions 22e comprising small areas defined by conductive traces for selectively increasing the area of a selected loop by cutting selected traces of portion 22e. By cutting small parts of portion 22e in loop 22b1 the field strength of loop 22b1 will increase while cutting small parts of portion 22e in loop 22b2 will increase the field strength of that loop.

If desired, sensors which made in accordance with the invention which have their coils disposed on a circuit board layer and in which the transition cross-over of the differential sense coils are implemented using vias to connect to circuit traces formed on a spaced apart layer can effectively have the magnetic field strengthened by inserting ferrite or other suitable material in vias, e.g., by inserting an iron pin therein. Further, if desired, the targets may be coated with magnetic material to further strengthen the field.

Various additional changes and modifications can be made in the above described details without departing from the nature and spirit of the invention. It is intended that the invention can be limited to such details except as set forth in the appended claims.

What is claimed:

1. A non-contact position sensor system comprising
at least one primary drive coil disposed on a generally planar surface, the drive coil having an input,
a plurality of differential sense coils disposed on a planar surface in magnetic field receiving relationship with the at least one drive coil, each sense coil having at least two loops arranged so that voltage induced in one loop is opposite in polarity to voltage induced in the other loop, and having an output,
a drive circuit connected to the input of the drive coil for providing a large di/dt pulse creating a magnetic field and a detection circuit connected to the outputs of the plurality of sense coils for detecting positive and negative pulses in the sense coil providing a digital output, each sense coil being connected to a separate channel in the detection circuit to provide a plurality of bits to form a binary word indicating positional information, and
a plurality of generally planar targets having an electrically conductive portion movable over the plurality of sense coils within the magnetic field of the drive coil, said plurality of sense coils arranged next to one another along a selected direction and a separate target provided for each loop being movable sequentially perpendicular to the selected direction.

2. A non-contact position sensor according to claim 1 in which the di/dt pulse is approximately at least 1 amp/microsecond.

3. A non-contact position sensor according to claim 2 in which the di/dt pulse is generated approximately every millisecond.

4. A non-contact position sensor according to claim 1 in which the detection circuit includes a latch for holding a detected digital output.

5. A non-contact position sensor according to claim 1 in which the detection circuit includes a diagnostic network to provide fault indication upon sensing selected fault conditions.

6. A non-contact position sensor according to claim 1 further comprising a circuit board having a plurality of layers, the drive and sense coils being disposed on at least one of the layers, the circuit board having vias formed with an electrically conductive lining extending between at least some of the layers and the loops of the sense coils have circuit portions on another layer interconnected through vias to provide opposite current directions.

7. A non-contact position sensor according to claim 6 further comprising at least one ground layer of electrically conductive material formed on a layer of the circuit board for shielding the detection circuit from stray electromagnetic fields.

8. A non-contact position sensor according to claim 6 further comprising magnetic field shaping material disposed in vias interconnecting loops of the sense coils.

9. A non-contact position sensor according to claim 1 in which the loops of each sense coil have a cross-over point at which the loops of each sense coil are interconnected and the loops have a width which is essentially equal at a location adjacent to the cross-over point.

10. A non-contact position sensor according to claim 6 in which the drive and sense coils are arranged on one layer of the circuit board.

* * * * *